United States Patent [19]

Blain

[11] Patent Number: 5,096,963
[45] Date of Patent: Mar. 17, 1992

[54] STABILIZED POLYMERIZABLE COMPOSITIONS

[75] Inventor: Stephen E. Blain, Hartford, Conn.

[73] Assignee: Loctite Corporation, Newington, Conn.

[21] Appl. No.: 308,698

[22] Filed: Feb. 9, 1989

Related U.S. Application Data

[63] Continuation-in-part of Ser. No. 155,662, Feb. 12, 1988.

[51] Int. Cl.$^5$ .................................................. C08K 5/05
[52] U.S. Cl. ...................................... 524/765; 524/385
[58] Field of Search ............... 524/765, 385; 526/212, 526/320, 323.1

[56] References Cited

U.S. PATENT DOCUMENTS

| | | |
|---|---|---|
| 2,201,395 | 5/1940 | Fletcher ............................. 524/553 |
| 3,247,143 | 4/1966 | Masters et al. ....................... 524/752 |
| 3,399,152 | 8/1968 | Jamrog et al. ......................... 524/40 |
| 3,832,315 | 8/1974 | Bueche ................................ 524/848 |
| 3,855,162 | 12/1974 | Durand et al. ....................... 524/732 |
| 3,971,744 | 7/1976 | Hudecek et al. ...................... 260/23 |
| 4,087,396 | 5/1978 | Hudecek et al. ..................... 524/773 |
| 4,640,938 | 2/1978 | Romer et al. ......................... 522/79 |

*Primary Examiner*—Joseph L. Schofer
*Assistant Examiner*—R. H. Delmendo
*Attorney, Agent, or Firm*—Vidas & Arrett

[57] ABSTRACT

Polymerizable compositions comprising a liquid polymerizable continuous phase and a non-liquid, non-polymerizable dispersed discontinuous phase are stabilized against density drift of the discontinuous phase by forming in-situ, throughout and within said polymerizable composition a crystalline matrix of sufficient density to effectively inhibit density drift.

12 Claims, No Drawings

STABILIZED POLYMERIZABLE COMPOSITIONS

This is a continuation-in-part of co-pending application Ser. No. 155,662 filed on Feb. 12, 1988 abandoned.

The present invention relates to polymerizable adhesive, coating and sealant compositions which are stabilized against "density drift" by creating a crystalline matrix through the polymerizable composition and a method for making the same. Specifically, polymerizable adhesive, coating and sealant compositions having an in-situ formed crystalline matrix througout the continuous phase of the polymerizable composition are temporarily immobilized such that the same are free or substantially free of any separation or settling, due to density differentiation, of constituents contained in said polymerizable composition upon storage.

BACKGROUND OF THE INVENTION

Polymerizable adhesive, coating and sealant compositions are well known. Typically, they comprise one or more reactive components, i.e., monomers and, optionally, comonomers, which react via condensation or addition polymerization reactions to form a cured or polymerized and/or, optionally, cross-linked, adhesive, coating or sealant. Phenols and formaldehyde and the reaction products thereof as well as amino compounds, especially ureas and melamines, and aldehydes, especially formaldehyde, and reaction products thereof are exemplary of the types of reactive components which react via a condensation type of polymerization. On the other hand, exemplary of the reactive components which polymerize, and/or cross-link via addition polymerization, there may be given vinyl compounds, epoxy compounds, unsaturated polyesters, poly- and monofunctional acrylate esters, styryloxy compounds, cyanoacrylate esters, mercapto and thiolene compounds, and urethanes as well as hybrids thereof e.g., polyacrylate-urethane, polyacrylate esters, thiolene-esters and the like.

Polymerizable compositions based on the foregoing reactive components may be either one-part or two-part polymerizable compositions and may or may not be carried in a solvent including, for example, water. Such polymerizable compositions may be self-reacting or may require the addition of a catalyst, initiator and/or accelerant to induce or enhance polymerization or curing of the same. In general, such polymerizable compositions may polymerize under aerobic or anaerobic conditions, as a result of their exposure to heat or to actinic radiation and the like. Furthermore, these polymerizable compositions may polymerize through two or more curing mechanisms or may comprise two or more polymerizable components each of which may cure independent of the other, i.e., by a different cure mechanism. For example, the polymerizable composition may contain a photopolymerizable component and an anaerobically polymerizable component. All of these facets of adhesive, coating and sealant technology, including specific formulations for the same, are well known and broadly disclosed in numerous publications and patents, including "Handbook of Adhesives", Erving Skeist, Ed. Reinhold Company 1977; "Advances in Adhesives" Brewis et al Ed. Warwick Publisher 1983; Encyclopedia of Polymer Science, H. F. Mark et al., Eds., 1987, and the numerous articles and patents referenced therein.

For the purpose of simplicity, hereinafter the term "polymerizable composition" shall refer to polymerizable and/or cross-linkable adhesive, coating and sealant compositions within the scope of the invention as described herein.

While many of the foregoing polymerizable compositions have excellent properties and characteristics, it is often desirable to further incorporate into said curable composition other additives which may enhance, modify or change the properties and/or characteristics of the cured or polymerized composition so as to be better suited for the many diverse applications for which they may be employed. Such additives include, but are not limited to, plasticizers, modifier resins and waxes, fillers, reinforcing agents, colorants, conductive agents, and the like, and are employed for such purposes as lower cost, higher strength, adhesion promotion, substrate wetability, greater heat resistance, flexibility, lower modulus, adhesion strength, low and elevated temperature performance, viscosity, less shrinkage, lower coefficient of thermal expansion, better electrical properties, and the like. Such additives, their purpose, and the amounts by which they are incorporated into the polymerizable compositions are well known.

Typically, the incorporation of additives into polymerizable compositions is as a dispersion thereof in the polymerizable composition. However, certain additives, especially liquid plasticizers, may be miscible with the polymerizable composition as well. Regardless, in order to obtain uniform performance from said additive modified polymerizable compositions, it is important that said additives be homogeneously dispersed therein. However, as a result of the different densities of the additives relative to the continuous phase or, with respect to miscible additives, within the continuous phase, there may be experienced a density drift or settling of the different constituents based on their density. This adverse effect is particularly troublesome for polymerizable compositions of low viscosity and long shelf or storage times. As a result of this density drift, as it is referred to herein, such polymerizable compositions manifest poorer and non-uniform properties unless the additive can be homogeneously dispersed once again. While vigorous shaking may recreate the homogeneous dispersion for polymerizable compositions of very low viscosity (highly liquid and flowable), such action is less successful for more highly viscous polymerizable compositions unless mechanically stirred for an extended time. Even so, these subsequent steps may not be feasible for a given polymerizable composition nor cost-effective. For example, polymerizable compositions containing an encapsulated activator, catalyst or accelerant may prematurely cure as a consequence of the rupture of the encapsulant particle upon vigorous shaking and/or mechanical mixing. Additionally, shearing stress caused by mechanical mixing may also adversely effect the reactive components and/or the additives e.g., rupturing of glass spheres, breaking of fibers and/or flake additives, etc.

Presently, attempts have been made to immobilize polymerizable compositions by incorporating therein a thixotropic agent. For example, colloidal silica, modified clays, and the like. Such thixotropic agents generally transform the polymerizable composition into a gel, thereby lessening the density drift, but not eliminating the same. Furthermore, unless high loading of said thixotropic agents are added, the gel formed may not be so stable as to greatly retard the progression of density drift, particularly upon long standing times. Also, it may not be desirable for the polymerizable composition to be in a gel form, as for example where high flowability is desired.

It is an object of the present invention to provide polymerizable compositions having constituents therein of different densities which do not drift or settle out even over long periods of time.

It is a preferred object of the present invention to provide polymerizable compositions having both a continuous polymerizable phase and a non-polymerizable discontinuous phase which do not suffer from density drift as a result of differing densities of the phases.

It is also an object of the present invention to provide density drift free, or essentially so, polymerizable compositions without permanently and significantly, if at all, altering the viscosity of the same.

Finally, it is also an object of the present invention to provide a method of preparing an immobilized polymerizable composition which is free or essentially free of density drift upon long term storage.

SUMMARY OF THE INVENTION

In accordance with the practice of the present invention, there are provided polymerizable compositions physically stabilized to prevent density drift of the constituents of said polymerizable compositions, said stabilized polymerizable compositions comprising:
  (a) a conventional polymerizable composition comprising at least two constituents of different densities, and
  (b) an immobilizing crystalline matrix formed within and throughout said polymerizable composition.

In general, said immobilizing crystalline matrix is formed from an immobilizingly effective amount of a crystallizable compound, said compound being:
  (a) non-reactive or substantially non-reactive with the constituents of the polymerizable composition;
  (b) Crystalline when present in the polymerizable composition at the storage temperature thereof,
  (c) either (i) miscible or partially miscible in the continuous phase of the polymerizable composition at temperatures above the melting temperature of said crystallizable compound or (ii) immiscible in the polymerizable composition at such temperatures provided said melted compound is dispersed continuously, or partly so, throughout the continuous phase of said polymerizable composition and is not present as an emulsion or wholly discontinuous phase;
  (d) either (i) insoluble or substantially insoluble in the polymerizable composition at a temperature at or below the crystallization temperature therein or (ii), if soluble or substantially soluble in said polymerizable composition, present in an amount in excess of its saturation point in said polymerizable composition and said excess crystallizable compound is crystalline at the storage temperature of the same; and
  (e) for thermal cure compositions meltable at a temperature below the temperature at which said polymerizable composition will polymerize or cure.

In its preferred embodiment, the conventional polymerizable composition comprises a liquid polymerizable continuous phase and a non-liquid, non-polymerizable dispersed discontinuous phase and said crystallizable compounds is (a) miscible or partly miscible in the curable composition at or above its melting temperature therein and (b) insoluble or substantially insoluble at a temperature at or below its crystallization temperature therein. Exemplary of suitable crystallizable compounds, there may be given alcohols, particularly long-chain alcohols of from about 11 to about 22 carbon atoms, most preferably of from about 16 to about 19 carbon atoms. Generally said crystallizable compound is present or employed in an amount of from about 0.5 to about 30% by weight, preferably from about 1 to about 15% by weight, most preferably from about 3 to about 8% by weight based on the weight of the continuous phase of said polymerizable composition.

The present invention also provides for a method of making said physically stabilized polymerizable composition. Specifically, a conventional polymerizable composition may be immobilized so as to physically stabilize the constituents thereof against density drift, said method comprising:
  (a) adding to a conventional polymerizable composition containing at least two constituents of different densities, an immobilizingly effective amount of a crystallizable compound, said crystallizable compound being:
    (i) non-reactive or substantially non-reactive with the constituents of the polymerizable composition;
    (ii) crystalline when present in the polymerizable composition at the storage temperature thereof;
    (iii) either (1) miscible or partially miscible in the continuous phase of the polymerizable composition at temperatures above the melting temperature of said crystallizable compound or (2) immiscible at such temperatures provided said melted compound is dispersed continuously, or partly so, throughout the continuous phase of said polymerizable composition and is not present as an emulsion or wholly discontinuous phase;
    (iv) either (1) insoluble or substantially insoluble in the polymerizable composition at a temperature at or below its crystallization temperature in said polymerizable composition or (2), if soluble or substantially soluble in said polymerizable composition, present in an amount in excess of its saturation point in said polymerizable composition and said excess crystallizable compound is crystalline at the storage temperature of the same; and
    (v) for thermal cure compositions, meltable at temperatures below the temperature at which said polymerizable composition will polymerize or cure;
  (b) elevating the temperature of the mixture of the crystallizable compound and polymerizable composition to a temperature at which the crystallizable compound will melt, thereby melting the crystallizable compound;
  (c) physically mixing the mixture;
  (d) cooling the mixture to a temperature below the crystallization temperature of the crystallizable compound so as to form in-situ a crystalline matrix within and throughout the, at least, continuous phase of said polymerizable composition.

Obvious variations of the foregoing method are possible. For example, the crystallizable compound and/or the polymerizable composition may be at or above the melting point of the former prior to the mixing thereof. Additionally, the crystallizable compound may be added after or during the preparation of the polymerizable composition.

Other aspects, benefits and features of the present invention will be more fully apparent from the ensuing disclosure and appended claims.

DETAILED DESCRIPTION OF THE PREFERRED EMBODIMENTS

The present invention has broad applications to conventional polymerizable, otherwise known as curable, adhesive, coating and sealant composition. Such polymerizable compositions include those which polymerize through either a condensation reaction, i.e., with the formation of by-product, typically water, or by addition polymerization, without the formation of by-product. Conventional polymerizable composition within the scope of the present invention generally comprise (i) at least one polymerizable, i.e., curable, monomer or monomer system, (ii) optionally, depending upon (i), a catalyst or polymerization initiator and/or accelerator therefor and (iii) optionally, one or more additives suitable for use with (i), provided at least one of the constituents of said polymerizable composition, after mixing, is capable of or tends to migrate or drift within the polymerizable composition so as to cause non-homogeneity in the constituent mixture. Generally, such migratory constituents tend to be immiscible or insoluble or only partly miscible or partly soluble in the polymerizable continuous phase at ambient temperature, or, if soluble or miscible, are present in an amount exceeding their saturation point in said continuous phase.

While it is believed that the present invention is suitable for immobilizing or physically stabilizing polymerizable composition wherein the migratory constituent is a liquid, including, for example, a co-polymerizable monomer and/or liquid cross-link additive or a liquid plasticizer, it is particularly and preferably suited to polymerizable composition wherein the migratable constituent is a non-liquid and is insoluble or substantially insoluble in the polymerizable continuous phase at ambient temperature. Such non-liquid constituents are non-reactive at ambient temperature but may be reactive at elevated temperatures, e.g., heat activated cross-linking agents. By the terms "reactive or non-reactive" applicant is hereby referring to the ability or inability of said constituent to copolymerize with the polymerizable monomer or prepolymer thereof so as to be incorporated into the finally cured polymer chain or cross-linked phase.

Furthermore, the present invention is suitable for use with both one-part and two-part polymerizable compositions. With the latter, either one or both parts of the two-part polymerizable composition may employ the in-situ formed crystalline matrix depending upon the make-up of the part(s) and the manifestation of constituent migration or density drift.

As stated above, conventional polymerizable composition within the scope of the present invention include those based on polymerizable monomers or monomer systems selected from the groups consisting of, but not limited to, vinyl compounds, novolaks, resoles, unsaturated polyesters, poly- and mono-functional acrylate esters, cyanoacrylate compounds, mercapto and thiolene compounds, epoxy and styryloxy compounds, urethanes and the like; hybrids thereof including, for example, polyacrylate-urethane, polyacrylate-esters, polyether-acrylates, and the like; and mixture of the foregoing. Such monomer and monomer systems are conventional and well known as well as widely published in journals, papers and patent literature.

A preferred class of polymerizable monomers are those containing at least one acrylic functionality; i.e., $H_2C=C(R)-C(O)-$ wherein R is H or alkyl, especially $C_1$ to $C_3$ alkyl, most preferable H or $CH_3$.

Especially preferred acrylic containing polymerizable monomers include the di- and poly-acrylate esters, particularly those of the formula:

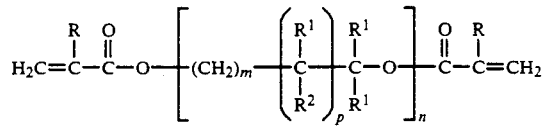

wherein each R is a radical independently selected from the group consisting of H, halogen and a $C_1$ to $C_4$ alkyl group, preferably H or $CH_3$; each $R^1$ is a radical independently selected from the group consisting of H, a $C_1$ to $C_4$ alkyl, a $C_1$ to $C_4$ hydroxy alkyl, and

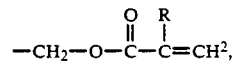

where in R is as described above; $R^2$ is a radical selected from the group consisting of H, hydroxyl and

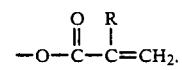

where in R is as described above; m is an integer of 0 to 12, preferably 1 to 8; n is an integer of at least 1, preferably from about 1 to about 20 or more, most preferably from 2 to 6; and p is 0 or 1. Exemplary of such di- and poly-acrylate esters, there may be given: di-, tri- and tetra-ethylene glycol dimethacrylate; dipropylene glycol dimethacrylate; polyethylene glycol dimethacrylate; di(pentamethylene glycol) dimethacrylate; tetraethylene glycol diacrylate; tetraethylene glycol di(chloroacrylate); diglycerol diacrylate; diglycerol tetramethacrylate; tetra methylene dimethacrylate; ethylene dimethacrylate; and neopantyl-glycol diacrylate.

While the di- and poly- acrylates of the preceeding paragraph are especially desirable, mono functional acrylates, i.e., those containing only one acrylate group, may also be advantageously used. Typical monoacrylates are of the general formula $CH_2=C(R)COOR^3$ where R is as described above and $R^3$ is a radical selected from the group consisting of $C_4$ to $C_{16}$, preferably $C_6$ to $C_{12}$ mono- or bicycloalkyl; a 3 to 8 membered heterocyclic radical having at most 2 oxygen atoms in the ring; H; $C_1$ to $C_{18}$, preferably $C_4$ to $C_{12}$ straight chain or branched alkyl; and a $C_1$ to $C_8$ hydroxyalkyl, cyanoalkyl, haloalkyl or aminoalkyl wherein the alkyl portion is either straight chain or branched. Exemplary of such suitable mono acrylates, there may be given cyclohexylmethacrylate; tetrahydropurpuryl methacrylate; hydroxyethyl acrylate, hydroxypropyl methacrylate, t-butyl acrylate, decyl methacrylate, dodecyl methacrylate, isobutyl methacrylate, t-butylamino ethyl methacrylate, cyano ethylacrylate, chloroethyl acrylate and 2-ethyl hexyl methacrylate.

Other known acrylates may also be used. These include the acrylic functionality containing resins such as epoxy-acrylates, urethane acrylates, polyether acrylates, silicone acrylates and the like. Exemplary of such acrylic functional resins, there may be given ethoxylated bishenol A dimethacrylate, propoxylated bisphenol C dimethacrylated, bisphenol A bis (2-hydroxypropyl) dimethacrylate, 4-methoxy carbonylamino-2-(2-methacryloxy) ethoxy carbonylamino toluene, 4-isopentyloxy carbonyl amino-2-(2-methacryloxy) ethoxycarbonylamino toluene, 4-isopentyloxy-carbonylamino-2-(2-methacryloxy) ethoxycarbonylamino toluene.

Additionally, the acrylate monomer may be copolymerized with non-acrylate monomers which readily react via vinyl-type addition. Such include alkyl resin and other unsaturated compounds including dially phthalate and dimethyl itacouate.

The foregoing acrylate monomer and monomer systems are well known and widely disclosed in patent literature including U.S. Pat. Nos. 3,043,820; 3,218,305; 3,457,212; 3,923,737; 3,425,998; 4,018,351; 4,259,909; 4,309,526; 4,380,613; 4,574,138; and 4,524,142; among others.

The second constituent of the polymerizable composition is the catalyst, activator or accelerator or other type polymerization controlling or governing agents. It is, of course, recognized that these constituents may be optional in some systems, particularly those that are self-polymerizing under certain conditions as, for example, in the presence of moisture or upon the addition of additional or a different reactive monomer. Generally, though, most polymerizable compositions will contain one or more of the foregoing type constituents. Such constituents are well known and the particular selection thereof will depend upon the polymerizable monomer or monomer systems employed and the mode of curing desired, i.e., thermal cure, photocure, or anaerobic cure. Typical activating constituents are those which generate free radicals, cations, or anions upon exposure to heat or actinic radiation.

Accelerants and other agents which control polymerization of the polymerizable monomer are also known. Generally, accelerants are additives which promote or speed up the rate of polymerization, for example trialkyl amine in peroxy cured anaerobic compositions. Other controlling agents include polymerization stabilizers, which have the ability to moderate polymerization under given conditions or to even inhibit polymerization. The latter is particularly effective where it may be desired to elevate the polymerization temperature of normally ambient or low temperature thermal cure polymerizable composition.

Exemplary of the types of initiators that may be employed with acrylic functional containing polymerizable monomers there may be given peroxy compounds, benz-ethers, azo containing compounds and the like. Peroxy compounds include the peroxides (organic as well as inorganic), hydro peroxides and peresters, including, for example, cumen hydroperoxide, t-butyl hydroperoxide, methyl ethyl ketone hydroperoxide, t-butyl perbenzoate, benzoyl peroxide, benzpinicol. Other initiators which may be employed include the azo initiators such as those available from DuPont under the Vazo trademark, azo-bis-isobutyronitrile, N-methyl diethanol-amine benzophenone, chlorothioxanthone, diethoxyxanthone, benzoin isopropyl ether, benzoin methyl ether, benzophenone and diethoxy acetophenone.

Accelerators which may be employed with the foregoing, as appropriate, include, for example, tertiary amines, such as tributyl amine; sulfimides such as benzoic sulfimide; formamide, and compounds containing transition metals such as copper octanoate.

The third group of constituents commonly found in the polymerizable composition are the additives therefor. Such additives include but are not limited to plasticizers, modifier resins, waxes, thixotropic agents, fillers, reinforcing agents, colorants, conductive fillers, and the like. As appropriate, these additives are added for such purposes as lower cost, higher strength, improved adhesion, substrate wettability, heat resistance, flexibility, higher modulus, low and elevated temperature performance, decreased shrinkage and lower coefficient of thermal expansion, improved thermal and electrical conductivity, higher arc resistance and dielectric strength and the like. Conventional additives are as set forth in Table 1 below.

TABLE 1

| Class | Examples |
| --- | --- |
| plasticizers | methyl ethyl ketone, dioctyl phthalate, tricresylphosphate, polysulfides, etc. |
| modifier resins | styrene-butadiene rubbers, ethylene propylene rubbers, nitrile rubbers polyethylene, etc. |
| waxes | paraffin, ethylene waxes, montan waxes, etc. |
| thixotropic agents | silica, fumed silica, modified clays, etc. |
| fillers, reinforcing agents, conductive filler, etc. | glass fibers, hollow spheres, beads; metal fiber, powder and flakes; quartz; mica; clays; silicas; alumina; graphite fiber; boron fiber; calcium carbonate; titanium dioxide; antimony oxide, etc. |

Specific formulations for the conventional polymerizable compositions is dependent upon the particular constituents thereof and the intended use of the same. It is well within the skill of one knowledgeable in the art to select monomer, activator and additives in the amounts desired in order to meet the specific needs of the end use application.

Furthermore, it is to be understood that the present invention is applicable to both one-part and two-part polymerizable compositions as well as to one-part compositions having dispersed therein an encapsulated activator therefore. Indeed, applicants' invention has particular applicability in this regard as the crystalline matrix will keep the encapsulant homogenously dispsersed in the continuous phase of the polymerizable composition.

While the crystallizable compound when added to the polymerizable composition may have an impact on the properties of the polymerizable or polymerized composition itself, e.g. enhanced lubricity, the true benefit of the crystallizable compound is its ability to form a crystalline matrix within and throughout the continuous phase of the polymerizable composition. By creating such a crystalline matrix, the polymerizable composition, particularly the dispersed discontinuous phase, is physically immobilized or stabilized so that the constituents thereof are unable to move to any significant extent. Consequently, homogeneous mixtures containing constituents subject to density drift remain in a homogeneous or substantially homogeneous state as a result of the immobilization caused by the crystalline matrix.

Crystallizable compounds within the scope of the invention include those, which are:

(a) non-reactive or substantially non-reactive with the constituents of the polymerizable composition at or below the temperature at which said crystallizable compound, in its melted state, is incorporated or homogeneously mixed with the polymerizable composition;

(b) crystalline in the polymerizable composition at the storage temperature of the same;

(c) either (i) miscible or partially miscible in the continuous phase of the polymerizable composition at temperatures at or above its melting temperature or (ii) immiscible in the polymerizable composition at said temperature provided the melted compound is dispersed continuously, or partly so, throughout the continuous phase of said composition and is not present as an emulsion or wholly discontinuous phase;

(d) either (i) insoluble or substantially insoluble in the polymerizable composition at or below its crystallization temperature therein or (ii), if soluble or partially soluble in said composition, present in an amount in excess of its saturation point in the polymerizable composition at or above the storage temperature of the same; and (e) for thermal cure compositions, meltable in the polymerizable composition below the temperature at which said composition will polymerize or cure, or substantially so.

Preferably, the crystallizable compound will be:

(a) non-reactive with the constituents of the polymerizable composition below the temperature at which said composition polymerizes or cures;

(b) crystalline in the polymerizable composition at temperatures up to about 30° C.;

(c) miscible or at least partially miscible in the continuous phase of the polymerizable composition in its melted state;

(d) insoluble or substantially insoluble, in the amounts employed, in the polymerizable composition in its crystalline state; and (e) for thermal cure compositions meltable at a temperature at least about 5° C. below the polymerization or cure temperature of the polymerizable composition.

Most preferably, the crystallizable compound is non-reactive or inert with respect to the constituents in the polymerizable composition and is crystalline therein at temperatures of up to about 40° C. Generally, the temperature at which the crystallizable compound is crystalline in the polymerizable composition depends upon the desired use of the same, mode of storage and transportation, and the like. For example, the crystallization temperature may be below ambient or room temperature, generally down to about 20° C. or below, provided the same are maintained under refrigeration, below said crystallization temperature, until its use. Generally, it is preferred that the crystallizable compound be in a crystalline state at room temperature, preferably at at least about 30° C., most preferably at about 40° C. or higher, particularly where ambient temperatures likely to be experienced by the curable composition prior to use are high. For example, polymerizable compositions likely to be employed in hot environments, e.g. coupling sealants for oil and/or gas operations, where ambient temperatures may achieve or exceed 50° C., then the crystallization temperature is preferably 55° C. or higher, preferably 60° C. or higher.

The amount of crystallizable compound employed in the practice of the present invention is an immobilizingly or stabilizingly effective amount. More specifically, an amount which is capable of forming a crystalline matrix within and throughout the continuous phase of the polymerizable composition so as to prevent or greatly inhibit density drift of the constituents thereof, particularly density drift of constituents comprising the dispersed discontinous phase, in the continuous phase, especially dispersed solid particulate constituents.

In general, the amount of crystalline compound employed will be from about 0.5 to about 30, preferably from about 1 to about 15, most preferably from about 3 to about 8 percent by weight based on the weight of the continuous phase. It is to be understood that these ranges may vary depending upon the solubility of the particular crystallizable compound in the specified polymerizable composition. As will be seen in the examples below, it may be necessary to employ 5 weight percent of the crystallizable compound in one monomer system in order to achieve the same immobilization or density of the crystalline matrix as may be found in another monomer system at 3 weight percent.

Furthermore, the amount of crystallizable compound employed, more specifically the amount employed in excess of the saturation point in the polymerizable composition, is determinative of the density of the crystalline matrix formed. The desired density is, at least in part, dependent upon the nature or make-up of the polymerizable composition. Thus, for an all liquid composition, it would be desirable to have a high density or degree of crystallinity in order to effectively inhibit or eliminate density drift of the liquids. On the other hand, a polymerizable composition having a high loading, i.e., 25% by weight or higher, of a solid discrete additive may require a low density or degree of crystallinity. In essence, it is most desirable to have as low a crystalline density or degree of crystallinity as is effective to immobilize the constituents of the polymerizable composition.

In addition to being indicative of the efficacy of the immobilization, the degree of crystallinity also controls, in part, the condition under which the polymerizable composition is subsequently employed or re-mobilized. With a low density or degree of crystallinity, simple shaking or the application of light pressure will be sufficient to break the crystalline matrix, thus releasing the polymerizable composition. With higher degrees of density or crystallinity more vigorous shaking, pressure or mechanical breaking is needed to break the crystalline matrix. Finally, with very dense, solid block-like crystalline matrix, it may be necessary to elevate the temperature to at least the melting temperature of the crystalline compound in order to destroy the matrix.

Of course, regardless of the density of those polymerizable compositions wherein the crystalline matrix has a melting temperature at or below ambient temperature, e.g. room temperature, the crystalline matrix of such composition will automatically melt upon removing the same from its refrigerated storage.

Exemplary of the crystallizable compounds suitable for use in the practice of the present invention there may be given those compounds meeting the above requirements and having at least one, preferably one or two, most preferably one hydroxy group. Furthermore, such compounds will preferably have a melting point of from about 10° C. to about 70° C., more preferably from about 35° C. to about 60° C., most preferably from about 50° C. to about 60° C. Of course, for compositions whose utility is in environments of high temperature, e.g., oil and/or gas pipeline sealants, it is prefered to have as the crystallizable compound one which melts at a high temperature, preferably above 50° C.

Specific examples of preferred compounds include the long chain aliphatic alcohols of from about 11 to about 22 carbon atoms, most preferably from about 16 to about 19 carbon atoms, including, for example, cetyl alcohol, stearyl alcohol and nonadecanol. Other alcohols including branched and/or cyclic alcohols should also suitable for use in the practice of the present invention.

The stabilized or immobilized polymerizable compositions of the present invention are prepared by dispersing the crystallizable compound in the polymerizable composition in a melted state and cooling the mixture to a temperature below that at which the crystallizable compound crystallizes in said polymerizable composition. The crystalline matrix so formed will either immobilize, or substantially so, the whole of the polymerizable composition or the dispersed phase contained therein, depending upon the density of the crystalline matrix.

Obviously, various embodiments for effecting the method of the present invention are possible. For example, the crystallizable compound may be added to the polymerizable composition either during or following formulation of the latter. Additionally, the crystallizable compound may be added in its crystalline state or after heating the same above its melt temperature. Similarly, the polymerizable composition may be heated to a temperature at or above the melting point of the polymerizable composition prior to the addition of the crystallizable compound or following the addition of the same so as to assure that the crystallizable compound is dispersed therein in a melted state.

Dispersion of the crystallizable compound in the polymerizable composition, prior to cooling thereof, may be accomplished by mechanical means, stirring or shaking. Obviously, it is desired to obtain a substantially homogeneous distribution of the melted crystallizable compound such that upon cooling of the mixture a uniform and substantially continuous crystalline matrix is formed.

The stabilized polymerizable composition so formed may be stored for extended periods of time without separation of the constituents thereof. Thus, excessive mixing of the polymerizable composition is not necessary to re-attain the homogeneous mixture as originally formulated. Rather, by simply breaking or melting the crystalline matrix, the homogeneous polymerizable composition is ready for applying to the selected substrate.

As stated previously, the preferred polymerizable compositions comprise a liquid polymerizable continuous phase and a non-liquid, non-polymerizable, dispersed discontinuous phase. Generally, the continuous phase may comprise the polymerizable monomer(s); the activator, catalyst and/or acceleration for polymerization thereof and plasticizers. The discontinous phase, on the other hand, may comprise an encapsulated activator, catalysts and/or accelerator; enert bulking filler; reinforcing filler; rubber particles, and the like. Where an encapsulated activator, catalyst and/or accelerant is present, an additional particulate additive will also be present so that the true benefit of the present invention is employed.

In general, the continuous phase will comprise from about 20 to about 95%, preferably from about 50 to about 85%, by weight of the total polymerizable composition. Of that, from about 20 to 95%, preferably from about 25 to 70%, by weight of the continous phase comprises one or more polymerizable and/or copolymerizable monomer. The remainder of the continuous phase comprises activator, catalyst and/or accelerant, generally from about 0.5 to about 8%, preferably from about 1 to about 6%, by weight and plasticizer, stabilizer and the like, generally up to about 79.5% by weight, preferably from about 25 to about 70% by weight.

Conversely, the discontinuous phase will comprise from about 5 to about 80%, preferably from about 15 to about 50%, by weight of the total polymerizable composition. The specific selection and amount of solid dispersed additive is dependent upon the particular additive and the desired properties and anticipated application of the compositions.

While the present invention is certainly useful for all polymerizable compositions containing a non-liquid, non-polymerizable dispersed discontinous phase it is particularly useful for those wherein the discontinuous phase comprises at least about 25% by weight of the total weight of the polymerizable composition. Generally, compositions having a low level of dispersed phase can easily be returned to a homogeneous state by simple mixing and/or shaking. However, with the higher loading of dispersed discontinuous phase, it is much more difficult to react the homogeneous state once the constituents have begun to settle out.

As noted above, the amount of crystallizable compound employed in the practice of the present invention is based upon the liquid phase, primarily the monomer content. While large amounts of crystallizable compound may be used, i.e., greater than about 15% by weight based on the weight of the liquid continuous phase it will generally not be necessary to do so. Furthermore, it is prefered to minimize the amount of crystallizable compound so as to prevent or minimize any subsequent deleterious effects on the polymerizable composition or its function. Thus, generally from about 3 to about 8% by weight based on the weight of the liquid continuous phase will suffice.

EXAMPLE 1

In order to demonstrate the broad concept and utility of the present invention and to guage the amount of crystallizable compound required in order to effect utility, a number of different polymerizable monomers were modified with various levels of cetyl alcohol. Though none of these examples are within the scope of the present invention (due to the absence of a dispersed, discontinous phase), the results are believed to be indicative of their efficacy in polymerizable compositions, within the scope of the present invention.

All examples were prepared by adding to a 100 ml polyethylene bottle the following ingredients in the order presented as follows:

1. butylated hydroxytoluene (BHT)
2. cetyl alcohol
3. polymerizable monomer

After making up the formulation, the bottles were heated in an oven at 55° C. to melt and dissolve the cetyl alcohol in the monomer. Thereafter, the bottles were removed from the oven and shaken to assure dispersion of the cetyl alcohol. The bottles were then set out at room temperature (about 21° C.) and allowed to cool. Crystallinity was noted, including relative degrees thereof, as shown in Table 1.

As seen in Table 1, the degree of crystallinity at similar loadings for various monomers differs considerably. Applicant believes this to be due, at least in part, to the degree of solubility of the cetyl alcohol in the different monomers. Thus, those monomers in which the cetyl alcohol has a lower degree of solubility would have a more dense crystalline matrix than one with a high degree of solubility at the same loading. Applicant also believes that while the foregoing examples are representative of the likely results in a polymerizable composition within the scope of the present invention, other constituents thereof, particularly other constituents comprising the liquid continous phase, i.e., liquid plasticizers, heat treatment additives and the like, may alter the solubility of the crystallizable compound.

TABLE 1*

|  | Example | | | | | | |
|---|---|---|---|---|---|---|---|
|  | A | B | C | D | E | F | G |
| Polymerizable Monomer (parts by weight) | 99 | 97 | 95 | 93 | 90 | 80 | 70 |
| Cetyl alcohol (parts by weight) | 1 | 3 | 5 | 7 | 10 | 20 | 30 |
| (1) polyethylene glycol dimethacrylate | 0 | 2 | 3 | 3 | 4 | 4 | 4 |
| (2) isodecyl methacrylate | 0 | 0 | 0 | 1 | 2 | 3 | 4 |
| (3) isobronyl methacrylate | 0 | 0 | 0 | 1 | 2 | 3 | 4 |
| (4) lauryl methacrylate | 0 | 0 | 0 | 1 | 2 | 4 | 4 |
| (5) benzyl methacrylate | 0 | 1 | 2 | 2 | 3 | 4 | 4 |
| (6) BPA/epichlorohydrin epoxy | 2 | 3 | 3 | 3 | 4 | 4 | 4 |
| (7) cycloaliphatic epoxy (Cryacure UVR-6200) | 0 | 0 | 1 | 2 | 3 | 3 | 4 |
| (8) ethorylated BPA bis-(5-norbornene-2-carboxylic acid ester) | — | 3 | — | 4 | 4 | — | 4 |

*All samples totaled 100.2 parts by weight, 100 parts by weight monomer plus cetyl alcohol, 0.2 parts by weight BHT.
Code:
0—no observable crystallization
1—free crystallinity, no continuous matrix
2—low density crystalline matrix
3—medium density crystalline matrix
4—high density crystalline matrix/solid

EXAMPLE 2

Two additional series of examples were prepared as in Example 1 with polyethylene glycol dimethacrylate (PEGMA) as the monomer and 3-penta decyl phenol and 2-amino-2-ethyl-1,3-propanediol as the crystallizable compound. No crystallinity was observed even at the highest loading of 70 parts monomer, 30 parts crystallizable compound.

With respect to the 2-amino, 2-ethyl, 1,3-propanediol, no miscibility was observed. The two components remained in separate liquid phases.

With respect to the 3-pentadecyl phenol, it is believed that the solubility thereof in the monomer was complete and thus no crystallization occurred. Applicants believe that higher loadings may cause crystallization or that additives may reduce the solubility thereof in the PEGMA to effect crystallization at the levels tried.

EXAMPLE 3

A conventional polymerizable composition (Base PC) was prepared comprising the following ingredients:

| Component | Wt % |
|---|---|
| polyethylene glycol dimethacrylate | 16.2 |
| tetraethylene glycol di-2-ethyl hexoate | 28.8 |
| perpoxylated BPA fumerate | 24.0 |
| teflon | 9.5 |
| mica | 13.4 |
| fumed silica | 1.7 |
| activator/accelerator package | 3.2 |
| stabilizer/colorant additive package | 3.2 |

This base polymer was then used in several embodiments of the present invention in order to demonstrate the ability and efficacy of the same. The formulations and results thereof were as presented in Table 2.

TABLE 2

|  | Example | | | | | | |
|---|---|---|---|---|---|---|---|
|  | H | 1 | 2 | 3 | 4 | 5 | 6 |
| Base PC | 100 | 95 | 97 | 99 | 92 | 90 | 88 |
| cetyl alcohol | — | 5 | 3 | 1 | 1 | 3 | 5 |
| graphite | — | — | — | — | 7 | 7 | 7 |
| Separation on standing | Y | N | N | * | * | N | N |

*-observation for separation not made, though no separation expected.

As seen in highly filled polymerizable compositions without the in-situ formation of a crystalline matrix, separation of the constituents occurred on standing. Separation was noted by the formation of a "clear" liquid phase toward the surface of the composition, denoting settling of the denser, filler constituents. However, where the crystalline matrix had been formed by adding the cetyl alcohol to the composition, heating the same to a temperature above its melting point, dispensing the same throughout the composition and then cooling the same, no observable separation was found.

EXAMPLE 4

A polymerizable sealant composition within the scope of the present invention was prepared as in the previous example, having the following formulation:

| Components | at % |
|---|---|
| polyethylene glycol dimethacrylate | 16.2 |
| tetraethylene glycol di-2-ethylhexoate | 9.4 |
| perpoxylated BPA fumerate | 20.0 |
| teflon | 8.0 |
| mica | 11.2 |
| polyethylene | 10.0 |
| graphite | 7.0 |
| tricresyl phosphate | 10.0 |
| activator/accelerator package | 2.0 |
| stabilizer/colorant package | 3.2 |
| cetyl alcohol | 3.0 |

No separation or settling was noted upon standing.

EXAMPLE 5

A further series of samples were prepared to scope out the breadth of the present invention. In this series, four diols, specifically 1,2-dodecanediol, 1,12-dodecanediol, 1,6-hexanediol and 1,8-octanediol were employed in polyethylene glycol dimethacrylate. These solutions were prepared according to the procedure employed for cetyl alcohol in Example 1 except that room temperature was now about 24° C. The results of this study were as set forth in Table 3.

TABLE 3*

|  | Example | | | | | | | |
| --- | --- | --- | --- | --- | --- | --- | --- | --- |
|  | H | I | J | K | L | M | N | O |
| Polyethylene Glycol Dimethacrylate (PEGMA) | 99.5 | 99 | 97 | 95 | 93 | 90 | 80 | 70 |
| Crystallizable Compound | 0.5 | 1.0 | 3.0 | 5.0 | 7.0 | 10 | 20 | 30 |
| (1) 1,12-dodecanediol | 1 | 1 | 2 | 3 | 4 | 4 | 4 | 4 |
| (2) 1,2-dodecanediol | 0 | 0 | 1 | 2 | 3 | 4 | 4 | 4 |
| (3) 1,8-octanediol | 0 | 0 | 1 | 2 | 3 | 4 | 4 | 4 |
| (4) 1,6-hexanediol | 0 | 0 | 1 | 2 | 2 | 3 | 3 | 4 |

*All samples totaled 100.2 parts by weight, 100 parts by weight PEGMA and crystallizable compound and 0.2 parts BHT. CRYSTALLINITY CODE: See Table 1.

As noted in Table 3, all these diols worked well in forming a crystalline matrix in-situ in the liquid acrylate monomer.

EXAMPLE 6

Finally, a series of samples were prepared within the scope of the invention and demonstrating the utility, effectiveness and broad application of the invention. Specifically, in this example, applicants attempted and succeeded in fixedly suspending the discontinuous phase (mica) in the continuous phase (polyethylene glycol dimethacrylate) with cetyl alcohol.

All of these samples were prepared in accordance with the procedure of Example 1 with the exception that rather than allow the compositions to cool in ambient atmosphere, the compositions were placed in an ice water bath to expedite cooling.

The specific formulations and results obtained with these samples were as shown in Table 4.

As seen from Table 4, where sufficient amount of the crystallizable compound, cetyl alcohol, was present to form the desired crystalline matrix, the mica was held suspended in the matrix. It is noted that at the 3 part by weight concentration (3% by weight based on monomer and crystallizable compound), partial settling of the mica did occur with the higher loadings of mica; however, substantial suspension of the mica was maintained. It is theorized that the weight of the mica may have caused a partial collapse of the light/moderate crystalline matrix achieved at this level of cetyl alcohol addition. Even so, substantial suspension or dispersion of the mica was retained in these samples and, thus, upon use, these materials would more readily reattain a homogeneous dispersion upon mixing than a fully settled formulation.

Thus, it is clear from the foregoing examples that the practice of the present invention allows for the production of stable dispersions of a non-liquid phase in a continuous liquid phase. As shown, these stable dispersions are, in effect, suspended or immobilized so as to allow for long-term storage between manufacture and use without settling or separation. This is particularly beneficial to highly filled systems where the creation of the dispersion is difficult and requires excessive mixing/aggitation for an extended period of time.

TABLE 4*

|  | Sample | | | | | | | |
| --- | --- | --- | --- | --- | --- | --- | --- | --- |
|  | P | R | Q | S | T | U | V | W |
| Polyethylene Glycol Dimethacrylate | 99.5 | 99 | 97 | 95 | 93 | 90 | 80 | 70 |
| Cetyl Alcohol | 0.5 | 1.0 | 3.0 | 5.0 | 7.0 | 10.0 | 20.0 | 30.0 |
| Mica | | | | | | | | |
| 0.5 | 0 | 1 | 3 | 3 | 3 | 3 | 3 | 3 |
| 30 | 0 | 1 | 2$^a$ | 3 | 3 | 3 | 3 | 3 |
| 60 | 0 | 1 | 2$^a$ | 3 | 3 | 3 | 3 | 3 |
| 100 | 0 | 1 | 2$^a$ | 3 | 3 | 3 | 3 | 3 |

*All ingredients specified in parts by weight; each sample also contained 0.2 parts by weight BHT.
CODE:
0-No observable crystallinity; mica settled in formulation.
1-Free crystallinity observed, no continuous matrix, mica settled in formulation.
2-Light/moderate crystalline matrix formed, partial settling of mica.
3-Heavy/solid crystalline matrix, no settling of mica.
$^a$After 60 days standing, the degree of settling was noted: 30% mica (about 50%); 60% mica (about 60%) and 100% mica (about 40%). Calculated as the volume of clear liquid in the comparable un-crystallized system divided by the volume of clear liquid in the partially crystallized system, the volume of clear liquid being that liquid above the mica upon settling of the mica.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

I claim:

1. A storage stable polymerizable composition comprising
   (a) a polymerizable composition comprising (i) a polymerizable liquid continuous phase comprising at least one polymerizable monomer and, optionally, as needed, an activator or catalyst for affecting polymerization of said polymerizable monomer, and (ii) a non-liquid, non-polymerizable dispersed discontinuous phase; and
   (b) a stabilizingly effective crystalline matrix within and throughout said polymerizable composition said crystalline matrix formed in-situ by crystallization of at least one crystallizable compound which is:
      (a) non-reactive or substantially non-reactive with the constituents of the polymerizable composition at or below the temperature at which said crystallizable compound, in its melted state, is incorporated or homogeneously mixed with the polymerizable composition;
      (b) crystalline in the polymerizable composition at the storage temperature of the same;
      (c) either (i) miscible or partially miscible in the continuous phase of the polymerizable composition at temperatures at or above its melting temperature or (ii) immiscible in the polymerizable composition at said temperature provided the melted compound is dispersed continuously, or partly so, throughout the continuous phase of said composition and is not present as an emulsion or wholly discontinuous phase;

(d) either (i) insoluble or substantially insoluble in the polymerizable composition at or below its crystallization temperature therein or (ii), if soluble or partially soluble in said composition, present in an amount in excess of its saturation point in the polymerizable composition at or above the storage temperature of the same; and (e) for thermal cure compositions, meltable in the polymerizable composition below the temperature at which said composition will polymerize or cure, or substantially so.

2. The storage stable polymerizable composition of claim 1, wherein the crystalline matrix is formed from a stabilizing effective amount of a crystallizable compound which is:

(a) non-reactive with the constituents of the polymerizable composition below the temperature at which said composition polymerizes or cures;

(b) crystalline in the polymerizable composition at temperatures up to about 30° C.;

(c) miscible or at least partially miscible in the continuous phase of the polymerizable composition in its melted state;

(d) insoluble or substantially insoluble, in the amounts employed, in the polymerizable composition in its crystalline state; and (e) for thermal cure compositions meltable at a temperature at least about 5° C. below the polymerization or cure temperature of the polymerizable composition.

3. The storage stable polymerizable composition of claim 2 wherein the crystalline matrix is formed from about 0.5 to about 30 percent by weight, based on the weight of the liquid continuous phase, of a crystallizable compound having at least one —OH group and a melting point of from about 10° C. to about 70° C.

4. The storage stable polymerizable composition of claim 2 wherein the crystallizable compound is an alcohol of from about 11 to about 22 carbon atoms.

5. The storage stable polymerizable composition of claim 2 wherein the crystallizable compound is cetyl alcohol.

6. The storage stable polymerizable composition of claim 2 wherein the polymerizable compound is employed in an amount of from about 1 to about 15 percent by weight, based on the weight of the liquid continuous phase.

7. The storage stable polymerizable composition of claim 2 wherein the crystallizable compound is employed in an amount of from about 3 to about 8 percent by weight based on the weight of the liquid continuous phase.

8. The storage stable polymerizable composition of claim 1 wherein the polymerizable monomer is a di- or poly-acrylate ester of the formula:

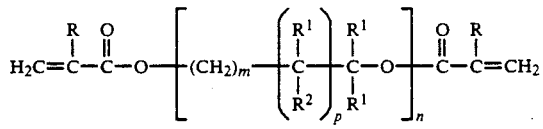

wherein each R is a radical independently selected from the group consisting of H, halogen and a $C_1$ to $C_4$ alkyl group; each $R^1$ is a radical independently selected from the group consisting of H, a $C_1$ to $C_4$ alkyl, a $C_1$ to $C_4$ hydroxy alkyl, and

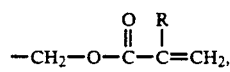

wherein R is as described above; $R^2$ is a radical selected from the group consisting of H, hydroxyl and

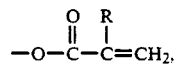

wherein R is as described above; m is an integer of 0 to 12, n is an integer of at least 1; and p is 0 or 1, and mixtures thereof.

9. The storage stable polymerizable composition of claim 1 wherein the polymerizable monomer is selected from the group consisting of diacrylate, polyacrylate, dimethacrylate and polymethacrylate esters and mixtures thereof.

10. The storage stable polymerizable composition of claim 9 wherein the acrylate ester is polyethylene glycol dimethacrylate.

11. The storage stable polymerizable composition of claim 1 including a free radical polymerization initiator.

12. The storage stable polymerizable composition of claim 1 wherein the non-liquid, non-polymerizable, dispersed discontinuous phase is selected from the group consisting of reinforcing agents, fillers, conductive agents, lubricants, rubber particles, waxes, and mixtures thereof.

* * * * *